Figure 1:
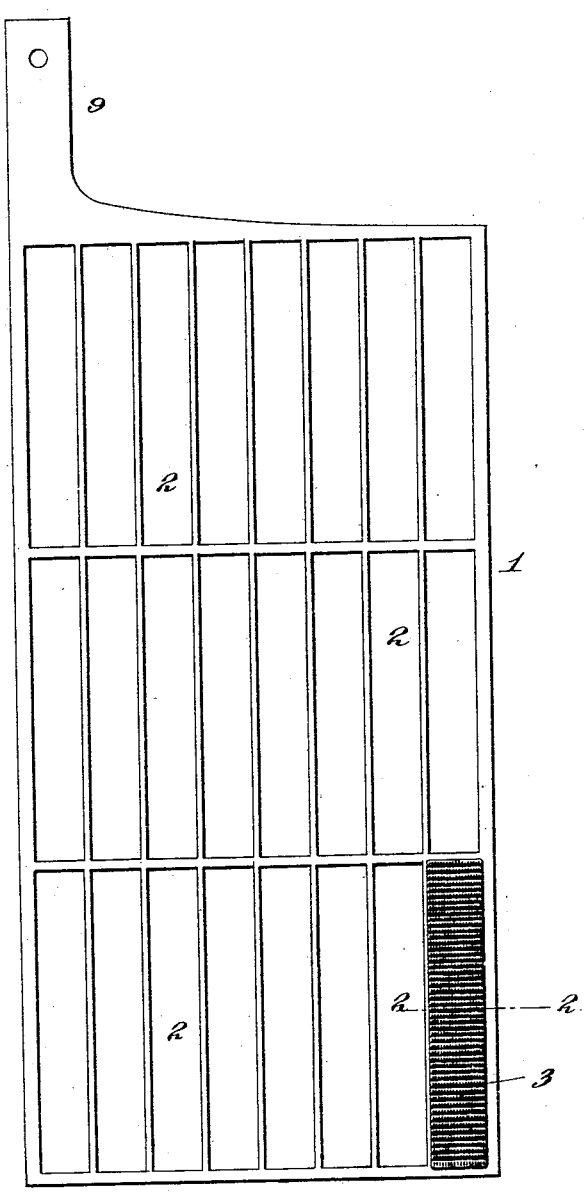

No. 704,306. Patented July 8, 1902.
T. A. EDISON.
REVERSIBLE GALVANIC BATTERY.
(Application filed June 20, 1901.)

(No Model.) 2 Sheets—Sheet 1.

Witnesses:
Jas. F. Coleman
Jno. Rob't Taylor

Inventor
Thomas A Edison
by Dyer Edmunds & Dyer
Att'ys.

No. 704,306. Patented July 8, 1902.
T. A. EDISON.
REVERSIBLE GALVANIC BATTERY.
(Application filed June 20, 1901.)
(No Model.) 2 Sheets—Sheet 2.
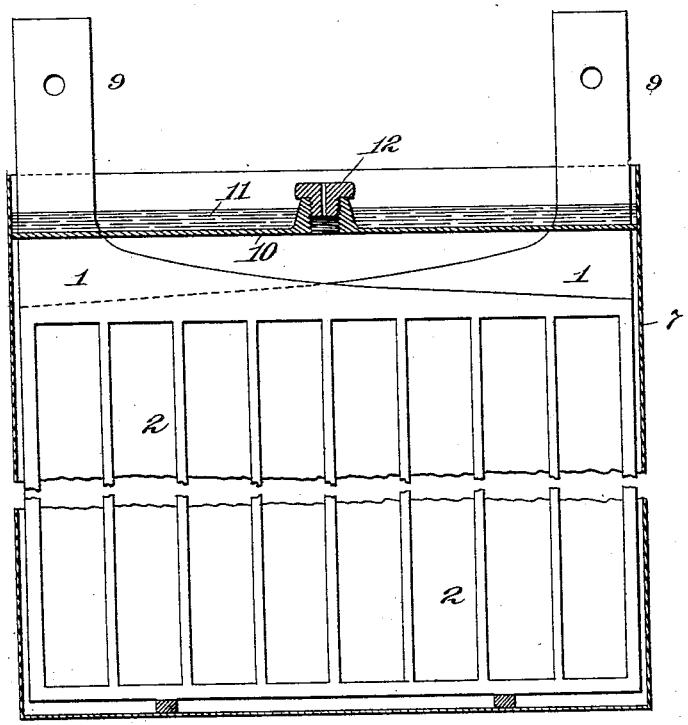
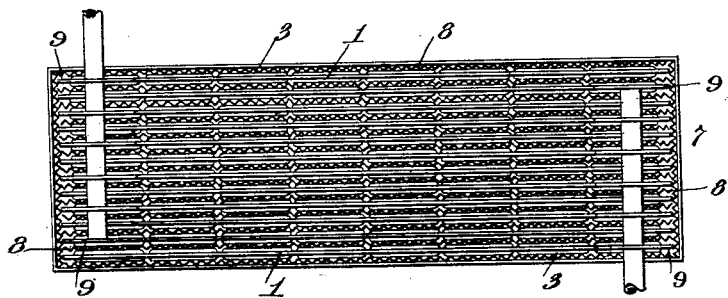
Witnesses: Jas. F. Coleman Jno. Robt Taylor
Inventor Thomas A. Edison by Dyer Edmunds & Dyer Att'ys.

UNITED STATES PATENT OFFICE.

THOMAS A. EDISON, OF LLEWELLYN PARK, NEW JERSEY, ASSIGNOR TO EDISON STORAGE BATTERY COMPANY, A CORPORATION OF NEW JERSEY.

REVERSIBLE GALVANIC BATTERY.

SPECIFICATION forming part of Letters Patent No. 704,306, dated July 8, 1902.

Application filed June 20, 1901. Serial No. 65,288. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Reversible Galvanic Batteries, (Case No. 1,064,) of which the following is a description.

My invention relates to improvements in reversible galvanic batteries of the type invented by me and described and claimed in my application filed October 31, 1900, Serial No. 34,994, wherein an electrolyte is employed which remains unchanged during all conditions of use and acts practically only as a conductor for the current, the active materials being entirely insoluble in the electrolyte during all stages of charge or discharge.

My object is to provide a cell of this type which shall be entirely permanent and which is of low cost per unit of power.

To this end the invention consists in a reversible galvanic battery of this character wherein finely-divided copper is employed as the oxidizable material and electrolytically-active oxid of nickel or cobalt is employed as the depolarizing material. Cobalt is not considered as desirable for use as nickel, owing to its greater cost and to the fact that it is slightly soluble in an alkaline electrolyte. Preferably both active materials are intimately mixed with a flake-like inert conducting substance, such as flake-graphite, in order that the conductivity of the cell may be increased. The conducting-supports are also preferably formed with perforated pockets or receptacles in which the active materials are contained, said receptacles being made of very thin spring-steel, high in carbon, and carefully nickel-plated, so as not to be affected by the alkaline solution. Owing to the cheapness of the metals employed in the construction of my improved cell and to their relative ease of manufacture, the improved reversible battery can be constructed at low cost, and hence will be especially desirable for use in connection with central-station work.

In order that my invention may be better understood, attention is directed to the accompanying drawings, forming part of this specification, and in which—

Figure 2:
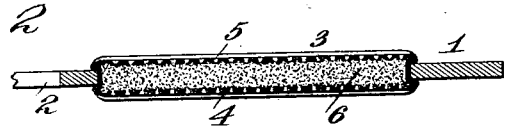

Figure 1 is a plan view of one of the plates for carrying the active materials, showing one of the pockets or receptacles in position; Fig. 2, a section on the line 2 2 of Fig. 1; Fig. 3, a vertical section through the complete cell; and Fig. 4, a top view of the cell, showing the cover thereof removed.

Each support for the active materials is formed of a plate 1, having rectangular openings 2 2 therein. The plates 1 are composed of sheet iron or steel, carefully nickel-plated, so as to be unaffected by the alkaline solution. Into each of the openings 2 is inserted a pocket or receptacle 3, made of two sections 4 and 5. Each pocket is composed, preferably, of very thin sheet-steel, high in carbon, so as to be very elastic, and carefully nickel-plated. The walls of each pocket are perforated, preferably by passing the sheets before being stamped into shape between male and female die rolls, whereby the metal will be displaced at each opening and an internally-projecting bur will be formed, which extends into the active material to increase the conductivity thereof. The active material in the form of blocks 6 is inserted in the smaller section 4 of each pocket, and the section 5 thereof is then placed like the cover of a box over the section 4 and both sections, with the intermediate block of active material, are inserted in one of the openings 2, after which a crimping pressure is applied to crimp the edges of the sections over upon the plate 1 to thereby hold the pockets or receptacles firmly in place and also to bind the sections thereof tightly together. The plates carrying the oxidizable and depolarizing materials, respectively, are obviously alternately arranged and are placed within a suitable jar or case 7, being separated by perforated corrugated hard-rubber partitions 8. Each plate is formed with a conducting-lug 9, which extends through the top 10 of the case, after which a layer 11 of paraffin or analogous material is poured upon the top to close any crevices around the lugs 9. The cover 10 of the case is provided with a threaded cap 12, having a gas-vent therein.

In constructing copper suitable for use as the oxidizable element in the cell I preferably obtain it in metallic form by reducing pure carbonate of copper in the usual way by hydrogen at the lowest possible temperature that will insure perfect reduction. The resulting finely-divided copper is then subjected in an open chamber to a temperature of not over 500° Fahrenheit for six or seven hours until the copper is converted into its black oxid, (CuO.) This black oxid is then mixed with flake-graphite or other flake-like conducting inert material and dampened, preferably with a potassic-hydroxid solution, the mass being then molded into blocks 6, which are inserted between the sections 4 and 5 of the pockets 3, which pockets are secured in place within the openings 2 of the proper plates by the application of pressure, as explained. When the cell is first charged, the black oxid of copper will be reduced to the metallic state, and in the subsequent discharging operation the metallic copper will be reoxidized until it is converted into the red oxid, ($Cu_2O$.) The finely-divided copper originally obtained by reduction by hydrogen, as explained, may be mixed with graphite and received within the pockets or receptacles without being first oxidized by heat, as described. I find, however, that when this is done the efficiency is not so high as when the copper is first oxidized to the black oxid.

I have found that unless the copper is in very finely divided form throughout a soluble blue salt will be produced, which results in local action and consequent rapid deterioration of the elements. In all prior experiments wherein the attempt was made to use copper as an active element in an alkaline solution this soluble copper salt was inevitably formed. The previous experimenters attempted to prevent the circulation of the soluble copper salt in the liquid by surrounding the copper element with a porous material, which while not preventing the current-flow would to a certain extent retard the circulation of the soluble copper salt. The experiments referred to were, however, unsuccessful, for the reason that the porous material would not permanently prevent the circulation of the soluble salt, and the peculiar porous materials which had to be used were themselves destroyed in time by the strong alkaline liquid necessarily employed for holding in solution a sufficient quantity of the active material. By having the copper in finely-divided condition throughout, as explained, the production of the soluble copper salt referred to is entirely overcome, since the effect of the current is to make anhydrous and insoluble in the alkaline liquid any copper oxid which may be formed.

The depolarizing material is either a hydrated oxid of nickel or of cobalt, preferably the former, for reasons explained. When nickel is used, I preferably obtain the hydrate in non-colloidal form (as I describe in my application filed May 9, 1901, Serial No. 59,512) by adding to a boiling solution of nitrate of nickel a sufficient quantity of magnesium hydroxid to precipitate the whole of the nickel as nickel hydroxid—i. e., $Ni(OH)_2$—the whole being then thrown into water, in which it settles almost immediately. By decanting the water and adding fresh water six or eight times and decanting after each addition the hydroxid is obtained very free from impurities. Afterward the excess of water is filtered off, and the hydroxid is then dried If desired, the green hydroxid so obtained may be further oxidized to the peroxid state to reduce the tendency to increase in bulk in use by passing chlorin gas through a receptacle filled with the dried hydroxid, the action of the chlorin on the hydrate being to oxidize the latter, producing hydrochloric acid, which combines with a portion of the hydroxid and forms chlorid of nickel, which is washed out by percolation and used again to give fresh hydrate. Finally the hydrated peroxid is dried and is ready for use. The dried hydrated peroxid or the dried green hydroxid is then mixed with flake-graphite or other flake-like inert conducting material in the proportions of six parts of the peroxid or hydroxid to four parts of the graphite. The mixture is then slightly moistened with water or a solution of potassic hydroxid and spread out on a glass plate and by means of a glass or porcelain roller pressed into a thin sheet. By means of a spatula the sheet is detached from the glass and broken up and rolled again. This operation is repeated a number of times until the finely-divided oxid covers nearly the whole surface of the graphite particles. The mass is then molded into blocks 6, which are received between the sections 4 and 5 of the pockets, after which the latter are secured in position within the openings 2 of the plates 1, as explained.

If instead of a hydrated oxid of nickel the corresponding oxid of cobalt is employed as a depolarizer, I may proceed, as I describe in my application filed March 1, 1901, Serial No. 49,452, by first precipitating the monoxid or black hydrated dioxid of cobalt in the usual way, washing the precipitate free from the products of the reaction, filtering off the liquid, and drying the precipitate. The resulting dried hydrated oxid is then powdered very fine and is mixed with flake-graphite or other inert flake-like conducting material in the proportion of about seven parts, by weight, of the powdered hydrate and three parts, by weight, of the flake-graphite, the mass being moistened with a small quantity of a strong solution of potassic hydroxid and molded into blocks 6, which are received between the sections 4 and 5 of the pockets or receptacles, and the latter are finally secured in place within the openings 2 of the plates 1.

The electrolyte employed with my improved battery is a solution of potassic hydroxid and water varying from ten to twenty-five per cent.

When my improved reversible galvanic battery is discharged, the copper will be raised to the red oxid, (Cu$_2$O,) and the hydrated oxid of nickel or cobalt will reduce to a low condition of oxidation. On charging, the depolarizing material will be raised to a superperoxid state, (higher than Ni$_2$O$_3$ or Co$_2$O$_3$, as the case may be,) and the copper will be reduced to the metallic condition.

I do not claim herein the depolarizer *per se*, nor the generic combination of such depolarizer with an oxidizable material, the electrolyte being unchanged during all conditions of use, since claims thereon are made in my application of even date, Edison No. 1,061.

By the expression "electrolytically-active oxid of a magnetic metal other than iron" as used by me in my claims I mean an electrolytically-active oxid of nickel or of cobalt or a mixture of such oxids.

Having now described my invention, what I claim as new, and desire to secure by Letters Patent, is as follows:

1. In a reversible galvanic battery, the combination of an electrolyte which remains unchanged during all conditions of use, a conducting-support, finely-divided copper carried by said support, a second conducting-support, and an electrolytically-active oxid of a magnetic metal other than iron carried by the second support, substantially as set forth.

2. In a reversible galvanic battery, the combination of an electrolyte which remains unchanged during all conditions of use, a conducting-support, finely-divided copper carried by said support, a second conducting-support, and a mixture of electrolytically-active oxid of a magnetic metal other than iron and a flake-like conducting material carried by the second support, substantially as set forth.

3. In a reversible galvanic battery, the combination of an electrolyte which remains unchanged during all conditions of use, a conducting-support, finely-divided copper carried by said support, a second conducting-support, and a mixture of electrolytically-active oxid of a magnetic metal other than iron and flake-graphite carried by the second support, substantially as set forth.

4. In a reversible galvanic battery, the combination of an electrolyte which remains unchanged during all conditions of use, a conducting-support, finely-divided copper carried by the conducting-support, a second conducting-support having perforated pockets or receptacles, and an electrolytically-active oxid of a magnetic metal other than iron carried within said pockets or receptacles, substantially as set forth.

5. In a reversible galvanic battery, the combination of an electrolyte which remains unchanged during all conditions of use, a conducting-support, finely-divided copper carried by the conducting-support, a second conducting-support having perforated pockets or receptacles, and a mixture of electrolytically-active oxid of a magnetic metal other than iron and an inert flake-like conducting material carried within said pockets or receptacles, substantially as set forth.

6. In a reversible galvanic battery, the combination of an electrolyte which remains unchanged during all conditions of use, a conducting-support, finely-divided copper carried by the conducting-support, a second conducting-support having perforated pockets or receptacles, and a mixture of electrolytically-active oxid of a magnetic metal other than iron and flake-graphite carried within said pockets or receptacles, substantially as set forth.

7. In a reversible galvanic battery, the combination of an electrolyte which remains unchanged during all conditions of use, a conducting-support, a mixture of finely-divided copper and a flake-like inert conducting material carried by said support, a second support, and an electrolytically-active oxid of a magnetic metal other than iron carried by the second support, substantially as set forth.

8. In a reversible galvanic battery, the combination of an electrolyte which remains unchanged during all conditions of use, a conducting-support, a mixture of finely-divided copper and flake-graphite carried by said support, a second support, and an electrolytically-active oxid of a magnetic metal other than iron carried by the second support, substantially as set forth.

9. In a reversible galvanic battery, the combination of an electrolyte which remains unchanged during all conditions of use, a conducting-support having perforated pockets or receptacles, finely-divided copper carried within said pockets or receptacles, a second conducting-support, and an electrolytically-active oxid of a magnetic metal other than iron carried by the second support, substantially as set forth.

10. In a reversible galvanic battery, the combination of an electrolyte which remains unchanged during all conditions of use, a conducting-support having perforated pockets or receptacles, a mixture of finely-divided copper and a flake-like conducting material carried within said pockets or receptacles, a second conducting-support, and an electrolytically-active oxid of a magnetic metal other than iron carried by the second support, substantially as set forth.

11. In a reversible galvanic battery, the combination of an electrolyte which remains unchanged during all conditions of use, a conducting-support having perforated pockets or receptacles, a mixture of finely-divided copper and flake-graphite carried within said pockets or receptacles, a second conducting-support, and electrolytically-active oxid of a magnetic metal other than iron carried by the second support, substantially as set forth.

12. In a reversible galvanic battery, the combination of an electrolyte which remains unchanged during all conditions of use, a conducting-support having perforated pockets or receptacles, finely-divided copper carried within said receptacles, a second conducting-support having pockets or receptacles, and electrolytically-active oxid of a magnetic metal other than iron carried within the receptacles of the second support, substantially as set forth.

13. In a reversible galvanic battery, the combination of an electrolyte which remains unchanged during all conditions of use, a conducting-support having perforated pockets or receptacles, a mixture of finely-divided copper and an inert conducting material carried within said pockets or receptacles, a second conducting-support having pockets or receptacles, and a mixture of electrolytically-active oxid of a magnetic metal other than iron and a flake-like conducting material carried within the pockets or receptacles of the second support, substantially as set forth.

14. In a reversible galvanic battery, the combination of an electrolyte which remains unchanged during all conditions of use, a conducting-support having perforated pockets or receptacles, a mixture of finely-divided copper and flake-graphite carried within said pockets or receptacles, a second conducting-support having pockets or receptacles, and a mixture of electrolytically-active oxid of a magnetic metal other than iron and flake-graphite carried within the pockets or receptacles of the second support, substantially as set forth.

15. In a reversible galvanic battery, the combination of an alkaline electrolyte, a conducting-support, copper carried thereby in such finely-divided form that when subjected to electrical oxidation it does not produce a copper salt soluble in such solution, a second conducting-support, and electrolytically-active oxid of a magnetic metal other than iron carried by the second support, substantially as set forth.

16. In a reversible galvanic battery, the combination of an electrolyte which remains unchanged during all conditions of use, a conducting-support, finely-divided copper carried by said support, a second conducting-support, and an electrolytically-active oxid of nickel carried by the second support, substantially as set forth.

17. In a reversible galvanic battery, the combination of an electrolyte which remains unchanged during all conditions of use, a conducting-support, finely-divided copper carried by said support, a second conducting-support, and a mixture of electrolytically-active oxid of nickel and a flake-like conducting material carried by the second support, substantially as set forth.

18. In a reversible galvanic battery, the combination of an electrolyte which remains unchanged during all conditions of use, a conducting-support, finely-divided copper carried by said support, a second conducting-support, and a mixture of electrolytically-active oxid of nickel and flake-graphite carried by the second support, substantially as set forth.

This specification signed and witnessed this 17th day of June, 1901.

THOMAS A. EDISON.

Witnesses:
FRANK L. DYER,
RICHD. N. DYER.